2,829,137

POLYALKYLENEPOLYPHOSPHINIC ACIDS

Seymour Yolles, Drexel Hill, Pa., assignor to E. I. du Pont de Nemours and Company, Wilmington, Del., a corporation of Delaware No Drawing. Application November 14, 1955
Serial No. 546,793

18 Claims. (Cl. 260—94.9)

This invention relates to new organic materials of polymeric character and to methods for their preparation.

This invention has as an object the preparation of new polymeric materials containing phosphorus which have rust-inhibiting properties and are soluble in alkali solutions and in certain organic solvents. Other objects will appear hereinafter.

These objects are accomplished by the present invention of polymeric materials containing phosphorus directly linked to carbon of a hydrocarbon polymer chain and also to an extracatenic monovalent hydrocarbon radical, the remaining valences of the phosphorus being satisfied by a doubly bonded oxygen and by either chlorine or a hydroxyl group. In the process aspect of this invention a hydrocarbon polymer of a lower, i. e., two to four carbon, alkene and a hydrocarbylphosphonous dichloride are reacted with oxygen at 40°–135° C.

In making the new hydrocarbophosphonated polyolefins of this invention a solution containing the lower olefin polymer and a hydrocarbylphosphonous dichloride is placed in a reactor equipped with stirrer, condenser, thermometer, and oxygen inlet tube. The solution is then heated to between 40° and 135° C. while a continuous stream of oxygen is passed therethrough. After reaction is complete, which may take from a few minutes to ten hours, the reaction mixture is poured into an ice-water mixture with rapid agitation to hydrolyze the polyolefinhydrocarbylphosphinic chloride to the corresponding acid. The finely divided solid polyolefinhydrocarbylphosphinic acid which separates is washed several times with water until the pH of the wash water is greater than 3, filtered, and dried.

The following examples in which parts are by weight are illustrative of the invention.

Example 1

In a reaction vessel fitted with a motor-driven stirrer, condenser, thermometer and sintered glass bubbler tube were place 10 parts of a polyethylene having a crystalline melting point of 115° C., a density of 0.925 at 25° C. and having a weight average molecular weight of about 400,000, 164 parts of phenylphosphonous dichloride ($C_6H_5PCl_2$) (distilled through 24″, helix-packed column, B. P. 73°–75° C. at 4 mm.) and one part of benzaldehyde. The polyethylene was dissolved with stirring and heating at 90° to 100° C. Oxygen was started through the solution at 100° C. and at a rate of 850 ml./min. The mildly exothermic reaction was controlled by careful cooling so that the temperature did not exceed 105° C. After 80 minutes the temperature had dropped to 65° C. and in 15 minutes more to 23° C. At this point there was added an additional part, by weight, of benzaldehyde, which caused the temperature of the reaction to rise to 62° C. Total time of reaction was 2.3 hours.

The reaction mixture (still in complete solution) was poured into two liters of a mixture of ice and water with very vigorous stirring (Waring Blendor) to hydrolyze the polyethylenephenylphosphinic chloride to the corresponding phosphinic acid. The finely divided light tan solid product was washed by vigorous stirring with water until the wash water had a pH greater than 3. After drying it weighed 19.1 parts.

The product analyzed for 0.35% Cl and 10.31% P, which corresponds to one $C_6H_5PO_2H$ group per 10.2 carbon atom units in the original polyethylene.

The product dissolved readily in dilute sodium and ammonium hydroxide solutions to give strongly foaming, surface-active solutions. It was insoluble in chlorobenzene, n-butanol, acetone, and chloroform, but soluble at room temperature in chloroform/methanol (2/1), trichloroethylene/methanol, chloroform/acetic acid (1/1), and n-butanol/xylene (1/1).

A portion of the polyethylenephenylphosphinic acid prepared as above was dissolved in an 86/14 (by weight) trichloroethylene/ethanol solvent mixture by gentle heating and stirring, to give a 2.4% solution.

Six autobody steel panels were cleaned by vapor degreasing them as follows:

The panels were held vertically in an apparatus in such manner as to expose them to the vapors of boiling trichloroethylene for five minutes. During this time the vapors condensed on the panels so that liquid trichloroethylene was flowing off the panel and back into the boiling liquid.

While the degreased panels were still hot from the trichloroethylene vapors, they were treated as follows:

*Panel 1.*—The panel was immersed vertically for one minute in the solution of the polyethylenephenylphosphinic acid prepared as described above, removed very slowly, allowed to dry, and baked for one half hour at 100° C.

*Panel 2.*—Same as panel 1, except that after drying the panel was subjected to the action of boiling trichloroethylene vapors for five minutes, then dried at room temperature. This panel was prepared to determine whether or not the polyethylenephenylphosphinic acid coating was removed by boiling trichloroethylene vapors.

*Panel 3.*—Same as panel 1, except that after drying the panel was washed with a 2/1 (by volume) trichloroethylene/ethanol mixture, a solvent for the polyethylenephenylphosphinic acid. The washing was accomplished by immersing the panel in the solvent and moving it up and down every five minutes for one hour. After drying, one corner of the panel was scratched with a knife to break the coating. This panel was prepared to determine whether the polyethylenephenylphosphinic acid coating could be removed by washing with an active solvent.

*Panel 4.*—This panel was prepared as a control by subjecting an autobody steel panel to the degreasing treatment previously described.

*Panel 5.*—Same as panel 3, except that before washing with 2/1 trichloroethylene/ethanol solvent mixture the panel was baked for 15 minutes at 100° C. It was then washed with the solvent as in the case of panel 3, and allowed to dry. This panel was prepared to show whether baking increased the resistance of the polymer coating to removal by solvent.

*Panel 6.*—Same as panel 2, except that after drying the coating the panel was subjected for one half hour to the vapors of a boiling 2/1 (by volume) trichloroethylene/ethanol solvent mixture. The refluxing vapors from this solvent mixture are largely a binary boiling at 70° C. to 71° C., which contains a higher proportion of ethanol than in the original solvent mixture. After drying, one corner of the panel was scratched with a knife to break the coating. This panel was prepared to show that the coating protects the steel even after extraction with refluxing vapors of an active solvent for the polymer.

The six panels prepared as described above were clean and bright. They were exposed outdoors at a 45° angle to the south and examined daily. Panel 4, the control, showed considerable rusting after overnight exposure, and after two days it was heavily rusted. In contrast the panels coated with polyethylenephenylphosphinic acid showed no rusting after a week exposure, except where the finish had been removed by scratching with the knife. After sixteen days outdoors the coated panels showed substantially no rusting. During this time essentially no differences were noted between the coated panels.

The above experiments illustrate not only the remarkable rust-preventive properties of the polyethylenephenylphosphinic acid but also the resistance of the films to solvent removal and their adherence to steel. They are thus different from the usual wash coats applied to metals to improve adhesion and prevent rusting. Films of comparable thickness from conventional unpigmented compositions on steel would afford little or no protection against rusting on outdoor exposure and even with coatings of usual thickness (1 to 2 mils) of such conventional finishes the metal usually shows underrusting within a few weeks. The superior rust-proofing properties of the polyethylenephenylphosphinic acid compared with the well-known phosphoric acid treatment of steel is shown by the fact that a commercial phosphoric acid-treated steel exposed outdoors with the six panels prepared as described above showed severe rusting after overnight exposure.

The panels treated with the polyethylenephenylphosphinic acid can be subsequently coated with conventional finishes such as varnishes, lacquers, primers, paints, etc.

*Example II*

One hundred parts of the polyethylene of Example I was dissolved in a mixture of 962 parts of perchloroethylene and 1115 parts of phenylphosphonous dichloride in equipment similar to that use in Example I, by stirring at 105° C. to 120° C. After adding 5 parts of benzaldehyde, oxygen was passed through the solution at the rate of 1200 ml./min. The exothermic action which ensued was controlled so that the temperature was kept within the limits of 110° C. to 120° C. At one and one-half hour intervals, 5 parts of benzaldehyde was added until a total of 25 parts had been added. After 6.5 hours the reaction was no longer exothermic and it was permitted to cool to room temperature. The reaction mixture was then hydrolyzed and the solid which separated washed as described in Example I. Residual perchloroethylene was removed from the product by further extraction with hexane. The polymer, after drying, weighed 185 parts and contained 7.42% phosphorus, which is equivalent to one $C_6H_5PO_2H$ group per 20 carbons in the chain.

This example illustrates a particularly advantageous modification of the invention wherein the reaction is conducted with the polymer and the hydrocarbyl phosphorus dichloride dissolved in a liquid chlorinated hydrocarbon. Any liquid chlorinated hydrocarbon may be used but the liquid chlorinated ethylenes are particularly suitable and perchloroethylene is preferred.

*Example III*

Fifteen parts of polypropylene of high molecular weight (melt index 0.07) was dissolved in 263 parts of phenylphosphonous dichloride in the equipment used in Example I by stirring at 125–130° C. After adding one part of benzaldehyde, oxygen was passed through the solution at 850 ml./min. The reaction was slightly exothermic for 20 min., then moderate heating was necessary to maintain the reaction temperature of 105–120° C. The rate of oxygen admission was gradually cut to 100 ml./min. because of excessive foaming. One part of benzaldehyde was added at the end of each 30-minute interval until a total of 4 parts had been added.

The liquid reaction mixture was poured into ice and water as in Example I to hydrolyze the polypropylenephenylphosphinic chloride to the phosphinic acid. After exhaustive washing with water and drying it weighed 15.3 parts.

The polymer analzed 1.82% phosphorus corresponding to about one $C_6H_5PO_2H$ group per 111 carbons.

The polymeric phosphinic acids of this invention are prepared from aliphatic hydrocarbon polymers having a molecular weight of at least 1000 and which are obtained by polymerizing one or more monoolefin hydrocarbons containing from 2 to 4 carbon atoms. The preferred polymers are the homopolymers prepared from ethylene, propylene, and the butylenes. Of these, polyethylene is preferred because of its ease of reacting, availability, and ready solubility in hydrocarbon phosphonous dichlorides.

The hydrocarbylphosphonous dichlorides used in preparing the polymeric hydrocarbylphosphinic acids of this invention correspond to the general formula $RPCl_2$, in which R is a monovalent hydrocarbon radical such as an alkyl, aryl, aralkyl, or cycloalkyl radical. Any hydrocarbylphosphonous dichloride, free from non-benzenoid carbon-carbon unsaturation, including ethylphosphonous dichloride, butylphosphonous dichloride, octylphosphonous dichloride, dodecylphosphonous dichloride, octadecylphosphonous dichloride, phenylphosphonous dichloride, tolylphosphonous dichloride, xylylphosphonous dichloride, benzylphosphonous dichloride, cyclohexylphosphonous dichloride, and methylcyclohexylphosphonous dichloride may be used in the process of this invention.

The amount of hydrocarbylphosphonous dichloride used depends in part upon the degree of phosphination required. The hydrocarbylphosphonous dichloride can, however, be used in large excess so that it functions both as reactant and reaction medium.

The phosphination of the lower olefin polymers is carried out in solution. As previously indicated, the hydrocarbylphosphonous dichlorides which are solvents for the polyethylene are preferably used. In their place or in conjunction therewith there may be used organic compounds which are solvents for the lower olefin polymers under the conditions of reaction. Specific examples of such are monochloro and dichlorobenzenes, perchloroethylene, etc. The amount of solvent used is that which will give a fluid solution at reaction temperature.

The phosphination is generally carried out at atmospheric pressure and at temperatures which range from 40° C. to 135° C. If desired, however, the phosphination may be effected under pressure but this has little, if any, practical advantage and adds to costs and by-product formation.

In practice, the lower olefin polymer is dissolved in the reaction medium, which is preferably the hydrocarbylphosphonous dichloride, by heating. After solution is complete, oxygen, or an oxygen containing gas, is bubbled through the solution while the system is maintained under rapid agitation. Since the phosphination reaction is highly exothermic the source of heat is replaced, after the reaction starts, by a cooling bath to maintain the temperature in the range selected for operation.

In the above working examples the phosphination has been effected in a batch operation. If desired, however, the phosphination can be carried out in a continuous operation.

Although catalysts are not necessary, their use is desirable for practical reasons. Suitable catalysts are the aldehydes, such as propionaldehyde, butyraldehyde, benzaldehyde, and the like.

The amount of catalyst used is usually from 1 to 10%, based on the lower olefin polymer being phosphinated.

The products obtained in the phosphination are the polyolefinhydrocarbylphosphinic monochlorides. They are converted to the acids by hydrolysis with water. If desired, however, the monochloride may be converted to an amide, hydrazide, or ester by reaction with ammonia, an amine, hydrazine, or an alcohol.

As illustrated by Example I the phosphinic acids of this invention are useful as rust inhibitors for steel. They are also useful as primer undercoats for paints, as surfactants in the form of salts and in the form of films, obtained by hot pressing at 150° C.–220° C. as anion-permeable membranes for use as barriers in metathesis reactions involving cations.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process which comprises reacting a lower monoolefin hydrocarbon polymer wherein the repeating olefinic units have 2 to 4 carbon atoms, with an oxygen containing gas, and a hydrocarbylphosphonous dichloride at 40° C. to 135° C.

2. The process which comprises reacting, with molecular oxygen at 40° C. to 135° C., a lower monoolefin hydrocarbon polymer wherein the repeating olefinic units have 2 to 4 carbon atoms, in solution in an arylphosphonous dichloride.

3. The process which comprises reacting, with molecular oxygen at 40° C. to 135° C., a lower monoolefin hydrocarbon polymer wherein the repeating olefinic units have 2 to 4 cabon atoms, in solution in phenylphosphonous dichloride.

4. The process which comprises reacting, with molecular oxygen at 40° C. to 135° C., a polyethylene in solution in a hydrocarbylphosphonous dichloride.

5. The process which comprises reacting, with molecular oxygen at 40° C. to 135° C., a polyethylene in solution in an arylphosphonous dichloride.

6. The process which comprises reacting, with molecular oxygen at 40° C. to 135° C., a polyethylene in solution in phenylphosphonous dichloride.

7. A polymer having, as essentially the only substituents on the wholly aliphatic hydrocarbon chain thereof, recurring phosphorus atoms attached also to chlorine, a monovalent hydrocarbon radical free from non-aromatic unsaturation, and, by a double bond, to oxygen.

8. A polymer having, as essentially the only substituents on the wholly aliphatic hydrocarbon chain thereof, recurring phosphorous atoms attached also to hydroxyl, a monovalent hydrocarbon radical free from non-aromatic unsaturation, and, by a double bond, to oxygen.

9. The polymer of claim 8 containing at least 1% phosphorus.

10. A lower olefin hydrocarbon homopolymer wherein the repeating olefinic units have 2 to 4 carbon atoms, having recurring hydrocarbylphosphinic acid substituents singly bonded through phosphorus to a carbon of the polymer chain.

11. A lower olefin hydrocarbon homopolymer wherein the repeating olefinic units have 2 to 4 carbon atoms, having recurring arylphosphinic acid substituents singly bonded through phosphorus to a carbon of the polymer chain.

12. A lower olefin hydrocarbon homopolymer wherein the repeating olefinic units have 2 to 4 carbon atoms, having recurring phenylphosphinic acid substituents singly bonded through phosphorus to a carbon of the polymer chain.

13. A polyethylene having recurring substituents on polymer chain carbon, said substituents being hydrocarbylphosphinic acid substituents, singly bonded through phosphorus to a carbon of the polymer chain.

14. A polyethylene having recurring substituents on polymer chain carbon, said substituent being arylphosphinic acid substituents, singly bonded through phosphorus to a carbon of the polymer chain.

15. A polyethylene having recurring substituents on polymer chain carbon, said substituents being phenylphosphinic acid substituents, singly bonded through phosphorus to a carbon of the polymer chain.

16. Process which comprises reacting, at 40° C. to 135° C., an oxygen-containing gas with a lower monoolefin hydrocarbon polymer wherein the repeating olefinic units have 2 to 4 carbon atoms, and a hydrocarbylphosphonous dichloride dissolved in a liquid chlorinated hydrocarbon.

17. Process which comprises reacting, at 40° C. to 135° C., an oxygen-containing gas with a lower monoolefin hydrocarbon polymer wherein the repeating olefinic units have 2 to 4 carbon atoms, and a hydrocarbylphosphonous dichloride dissolved in a liquid chlorinated ethylene.

18. Process which comprises reacting, at 40° C. to 135° C., an oxygen-containing gas with a lower monoolefin hydrocarbon polymer wherein the repeating olefinic units have 2 to 4 carbon atoms, and a hydrocarbylphosphonous dichloride dissolved in perchloroethylene.

References Cited in the file of this patent

UNITED STATES PATENTS 2,671,080    McCormack            Mar. 2, 1954